United States Patent
Ogawa et al.

(10) Patent No.: US 6,361,440 B1
(45) Date of Patent: Mar. 26, 2002

(54) GAME SYSTEM, GAME MACHINE, GAME DATA DISTRIBUTION MACHINE, NETWORK SYSTEM AND INFORMATION STORAGE MEDIUM

(75) Inventors: Toru Ogawa, Tokyo; Akihiko Moriguchi, Yokohama, both of (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/496,347

(22) Filed: Feb. 2, 2000

(30) Foreign Application Priority Data

Feb. 4, 1999 (JP) .......................................... 11-026918

(51) Int. Cl.[7] .......................... A63F 13/00; A63F 9/24; G06F 17/00; G06F 19/00
(52) U.S. Cl. ............................. 463/42; 463/40; 463/41; 463/43; 463/29; 463/46; 463/47; 700/90; 709/200; 709/201; 709/208; 709/209; 709/230; 709/231; 709/250; 709/232; 709/233; 710/58; 710/60; 710/61; 273/453; 273/454; 273/460
(58) Field of Search ............................... 463/42, 40, 41, 463/43, 29, 46, 47; 700/90, 91, 92; 273/453, 454, 455, 459, 460, 461, 148 B; 709/200, 201, 208, 209, 230, 231, 232, 233, 234, 235, 249, 250; 710/52, 58, 60, 61

(56) References Cited

U.S. PATENT DOCUMENTS

| | | | | |
|---|---|---|---|---|
| 4,572,509 A | * | 2/1986 | Sitrick .................. | 273/85 G X |
| 4,677,433 A | * | 6/1987 | Catlin et al. ......... | 340/825.2 X |
| 5,263,172 A | * | 11/1993 | Olnowich ............... | 395/800 X |
| 5,272,729 A | * | 12/1993 | Bechade et al. ........ | 375/118 X |
| 5,408,408 A | * | 4/1995 | Marsico, Jr. ................ | 364/410 |
| 5,522,050 A | * | 5/1996 | Amini et al. ........... | 395/306 X |
| 5,550,533 A | * | 8/1996 | Pawlowski ........... | 340/825.2 X |
| 5,625,805 A | * | 4/1997 | Fenwich et al. ............ | 395/558 |
| 5,668,492 A | * | 9/1997 | Pedersen et al. ........ | 327/291 X |
| 5,860,024 A | * | 1/1999 | Kyle et al. .............. | 395/836 X |
| 5,909,560 A | * | 6/1999 | Kenny et al. ........... | 395/309 X |
| 5,909,571 A | * | 6/1999 | Polzin et al. ........... | 395/559 X |
| 5,918,073 A | * | 6/1999 | Hewitt .................... | 395/827 X |
| 6,038,623 A | * | 3/2000 | Schutte .................... | 710/100 X |

* cited by examiner

Primary Examiner—Joe H. Cheng
Assistant Examiner—Binh-An D. Nguyen
(74) Attorney, Agent, or Firm—Oliff & Berridge, PLC

(57) ABSTRACT

The invention provides a game system, a game machine, a game data distribution machine, a network system and an information storage medium whose clocks can be synchronized. The game system comprises a game data distribution machine having a master function and including a clock selection section for generating indication data for obtaining clock information and a transmitting/receiving section for transmitting the generated indication data and a game machine having a slave function and including a transmitting/receiving section for receiving the indication data sent from the game data distribution machine and a clock selection section for adjusting the clock speed of own machine so as to synchronize the clock of own machine with the clock of the game data distribution machine based on the received indication data.

15 Claims, 8 Drawing Sheets

GAME SYSTEM, GAME MACHINE, GAME DATA DISTRIBUTION MACHINE, NETWORK SYSTEM AND INFORMATION STORAGE MEDIUM

BACKGROUND OF THE INVENTION

1. Field of the Invention

The present invention relates to a game system, a game machine, a game data distribution machine, a network system and an information storage medium.

2. Description of the Related Art

Normally, each machine on a network operates asynchronously in relation to a clock signal which determines operating speed of an image display and the like within the machine. Accordingly, there is a case when the progress such as image display or the like becomes different gradually between each of machines, thus giving a sense of incongruity to a person watching the images.

Then, in order to solve this problem, the inventor of the present application has provided a method of transmitting a clock signal itself which is the basis of synchronization and distributed data including game data from one master machine to each slave machine to synchronize the respective machines.

However, when an enough transmission band for distributing such clock signal itself cannot be ensured, an amount of data for synchronization and a number of times of distributing data for synchronization must be reduced.

Particularly, in a network type game system in which players play a game executed on real-time while a plurality of game machines are synchronized each other, it is important to synchronize the respective game machines adequately so as not to give any sense of incongruity to the persons watching the game screens.

SUMMARY OF THE INVENTION

It is an object of the present invention to provide a game system, a game machine, a game data distribution machine, a network system and an information storage medium which allow the clock of the respective machines to be synchronized adequately without giving any sense of incongruity to persons watching images displayed based on data distributed among the respective machines linked to a network via a transmission path having a limited transmission band.

(1) In order to solve the above-mentioned problem, according to a first aspect of the invention, with a game system in which at least one slave machine is connected with a master machine via a transmission path, the slave machine and the master machine operating synchronously each other, the master machine comprises:
  means for generating indication data indicative of clock speed; and
  means for transmitting the generated indication data to the slave machine, the slave machine comprises:
  means for receiving the indication data transmitted from the master machine; and
  clock adjusting means for adjusting the clock speed of the slave machine so as to synchronize with the clock speed of the master machine based on the received indication data, and the clock adjusting means adjusts the clock speed of the slave machine so as to reduce the clock speed of the slave machine when the clock speed thereof is faster than the clock speed of the master machine and to increase the clock speed of the slave machine when the clock speed thereof is slower than the clock speed of the master machine, based on the received indication data.

(2) According to a second aspect of the invention, with a network system in which at least one image display machine is connected with an image distribution machine for distributing image data for displaying images on the image display machine via a transmission path, the image display machine and the image distribution machine operating synchronously each other, the image distribution machine comprises:
  means for generating indication data indicative of clock speed; and
  means for transmitting the generated indication data to the image display machine, the image display machine comprises:
  means for receiving the indication data transmitted from the image distribution machine; and
  clock adjusting means for adjusting the clock speed of the image display machine so as to synchronize with the clock speed of the image distribution machine based on the received indication data, and the clock adjusting means adjusts the clock speed of the image display machine so as to reduce the clock speed of the image display machine when the clock speed thereof is faster than the clock speed of the image distributing machine and to increase the clock speed of the image display machine when the clock speed thereof is slower than the clock speed of the image distributing machine, based on the received indication data.

(3) According to a third aspect of the invention, a game data distribution machine for distributing game data for playing a game to a plurality of game machines in which the game is played while a progressing state of the game in each of the game machines is synchronous each other comprises:
  means for generating the game data;
  means for generating indication data indicative of the clock speed which determines generating speed of the game data; and
  means for transmitting the indication data and the game data to the game machines.

(4) According to a fourth aspect of the invention, a game machine for playing a game with another game machine while a progressing state of the game in the game machine is synchronous with a progressing state of the game in the other game machine comprises:
  means for receiving game data from a game data distribution machine for distributing the game data to the game machine and to the other game machine, and indication data indicative of clock speed from the game data distribution machine; and
  clock adjusting means for adjusting the clock speed of the game machine so as to synchronize with the clock speed of the other game machine based on the received indication data,
  wherein the clock adjusting means adjusts the clock speed of the game machine so as to reduce the clock speed of the game machine when the clock speed thereof is faster than the clock speed of the game data distribution machine and to increase the clock speed of the game machine when the clock speed thereof is slower than the clock speed of the game data distribution machine, based on the received indication data.

(5) According to a fifth aspect of the invention, a game machine realizing at least one of a master function and a slave function and operating synchronously with another game machine comprises:

means for generating indication data indicative of clock speed in realizing the master function;

means for transmitting the generated indication data to the other game machine in realizing the master function;

means for receiving the indication data sent from the other game machine in realizing the slave function;

clock adjusting means for adjusting the clock speed by a predetermined adjustment amount at a time, based on the received indication data in realizing the slave function; and means for executing a game based on the adjusted clock speed in realizing the slave function, wherein the clock adjusting means reduces the clock speed of the game machine when the clock speed thereof is faster than the clock speed of the other game machine and increases the clock speed of the game machine when the clock speed thereof is slower than the clock speed of the other game machine, based on the received indication data.

(6) According to a sixth aspect of the invention, a game machine realizing at least one of a master function and a slave function and operating synchronously with another game machine comprises:

a circuit for generating indication data indicative of clock speed in realizing the master function;

a circuit for transmitting the generated indication data to the other game machine in realizing the master function;

a circuit for receiving the indication data sent from the other game machine in realizing the slave function;

a clock adjusting circuit for adjusting the clock speed by a predetermined adjustment amount at a time, based on the received indication data in realizing the slave function; and a circuit for executing a game based on the adjusted clock speed in realizing the slave function, wherein the clock adjusting circuit reduces the clock speed of the game machine when the clock speed thereof is faster than the clock speed of the other game machine and increases the clock speed of the game machine when the clock speed thereof is slower than the clock speed of the other game machine, based on the received indication data.

(7) According to a seventh aspect of the invention, with computer-usable information embodied on an information storage medium or in a carrier wave, for synchronizing among a plurality of game machines in which the game is played while a progressing state of the game in each of the game machines is synchronous each other, the information further comprises information for realizing:

means for generating indication data which indicates clock speed for determining generating speed of game data for playing the game and is a reference of operating speed of the game machines; and means for transmitting the indication data to the game machines.

(8) According to an eighth aspect of the invention, with computer-usable information embodied on an information storage medium or in a carrier wave, for a computer playing a game with a game machine while a progressing state of the game in the computer is synchronous with a progressing state of the game in the game machine, the information further comprises information for realizing:

means for receiving game data from a game data distribution machine for distributing the game data to the computer and to the game machine, and indication data indicative of clock speed from the game data distribution machine; and clock adjusting means for adjusting the clock speed of the computer so as to synchronize with the clock speed of the game machine based on the received indication data, and the clock adjusting means adjusts the clock speed of the computer so as to reduce the clock speed of the computer when the clock speed thereof is faster than the clock speed of the game data distribution machine and to increase the clock speed of the computer when the clock speed thereof is slower than the clock speed of the game data distribution machine, based on the received indication data.

(9) According to a ninth aspect of the invention, with computer-usable information embodied on an information storage medium or in a carrier wave, for realizing at least one of a master function and a slave function, the information further comprises information for implementing:

means for generating indication data indicative of clock speed in realizing the master function;

means for transmitting the generated indication data to at least one of game machines which have the slave function in realizing the master function;

means for receiving the indication data sent from a game machine which has the master function in realizing the slave function;

clock adjusting means for adjusting the clock speed by a predetermined adjustment amount at a time, based on the received indication data in realizing the slave function; and means for executing a game based on the adjusted clock speed in realizing the slave function, and the clock adjusting means reduces the clock speed of a computer which uses the computer-usable information when the clock speed thereof is faster than the clock speed of the game machine which has the master function and increases the clock speed of the computer when the clock speed thereof is slower than the clock speed of the game machine which has the master function, based on the received indication data.

According to this aspect of the invention, the clock of the master machine is synchronized with that of the slave machine by transmitting the indication data from the machine having the master function to the machine having the slave function. Here, the clock means a clock signal which is the basis of operating speed of each section within the machine. Accordingly, each section within the machine may be operated synchronously by synchronizing the clock. Thereby, the image displaying section and the sound producing section are synchronized among each machines and the display of the game screen and the production of the game sound may be adequately synchronized.

Further, because a data amount of the indication data itself is small as compared to the clock signal itself, the transmission of the indication data will hardly affect the transmission band. Accordingly, it is effective in synchronizing among game processing machines which become opponents in a fighting type game, in playing a game while making communication with a remote site and in playing a network type game in a limited transmission band.

It is noted that the indication data is an accumulated clock-count, an accumulated raster-count and the like for example.

When the game data and the indication data are generated and distributed to the plurality of game machines, the clock speed is adjusted based on the indication data in the game machine. Then, because the image displaying means and the like within the game machine operate based on the clock speed, it becomes possible to adequately synchronize and display the game images among the game machines when the game images are displayed based on the game data. It is noted that the game data includes at least one of game image data for displaying game images and game sound data fore producing game sound.

(10) According to a tenth aspect of the invention, it is preferable that the clock adjusting means adjusts the clock speed of the slave machine so as to reduce the clock speed of the slave machine when the clock speed thereof is faster than the clock speed of the master machine and to increase the clock speed of the slave machine when the clock speed thereof is slower than the clock speed of the master machine, based on the received indication data.

Thereby, the machine having the slave function can be synchronized with the machine having the master function by adjusting its clock speed. That is, the synchronization among the master and slave machines may be realized without putting a load on the master machine.

(11) According to an eleventh aspect of the invention, it is preferable that the clock adjusting means finely adjusts the clock speed of the slave machine so as to change gradually to the clock speed of the master machine by a predetermined adjustment amount at a time, based on the received indication data.

It allows the clock speed of the slave machine to be adjusted gradually so as to change to that of the master machine as a target. That is, even when an error occurs in the indication data or the transmission is delayed, the clock may be synchronized with the clock of the master machine accurately without reacting to those abnormal states as much as possible.

Here, preferably the predetermined adjustment amount is a degree which will not change the clock speed considerably. That is, the game player can play the game conformably without noticing the implementing moment of the synchronous adjustment because the synchronization may be taken without disturbing the sounds and images by synchronizing the clock by the fine adjustment.

(12) According to a twelfth aspect of the invention, it is preferable that the indication data is an accumulated clock-count.

It allows the slave side to run individually by using own clock and the synchronization may be taken at the point of time when the next indication data is received by synchronization using an accumulated clock-count as a unit even when the indication data is omitted by a communication error or the like.

(13) According to a thirteenth aspect of the invention, it is preferable that the game machine realizes the master function when being started before the other game machine, and realizes the slave function when being started after the other game machine.

It allows the respective game machines to be adequately synchronized each other when the game machine increases after another, because the game machine activated at first functions as the master machine.

DESCRIPTION OF THE PREFERRED EMBODIMENTS

Preferred embodiments to which the present invention is applied will be explained below with reference to the drawings.

A case in which the invention is applied to a game system in which a game data distribution machine functioning as a master machine and a plurality of game machines functioning as slave machines belonging to the master machine are connected via a network including transmission paths to play a game on real-time while synchronizing images among the respective processing machines will be explained at first.

Figure 1:
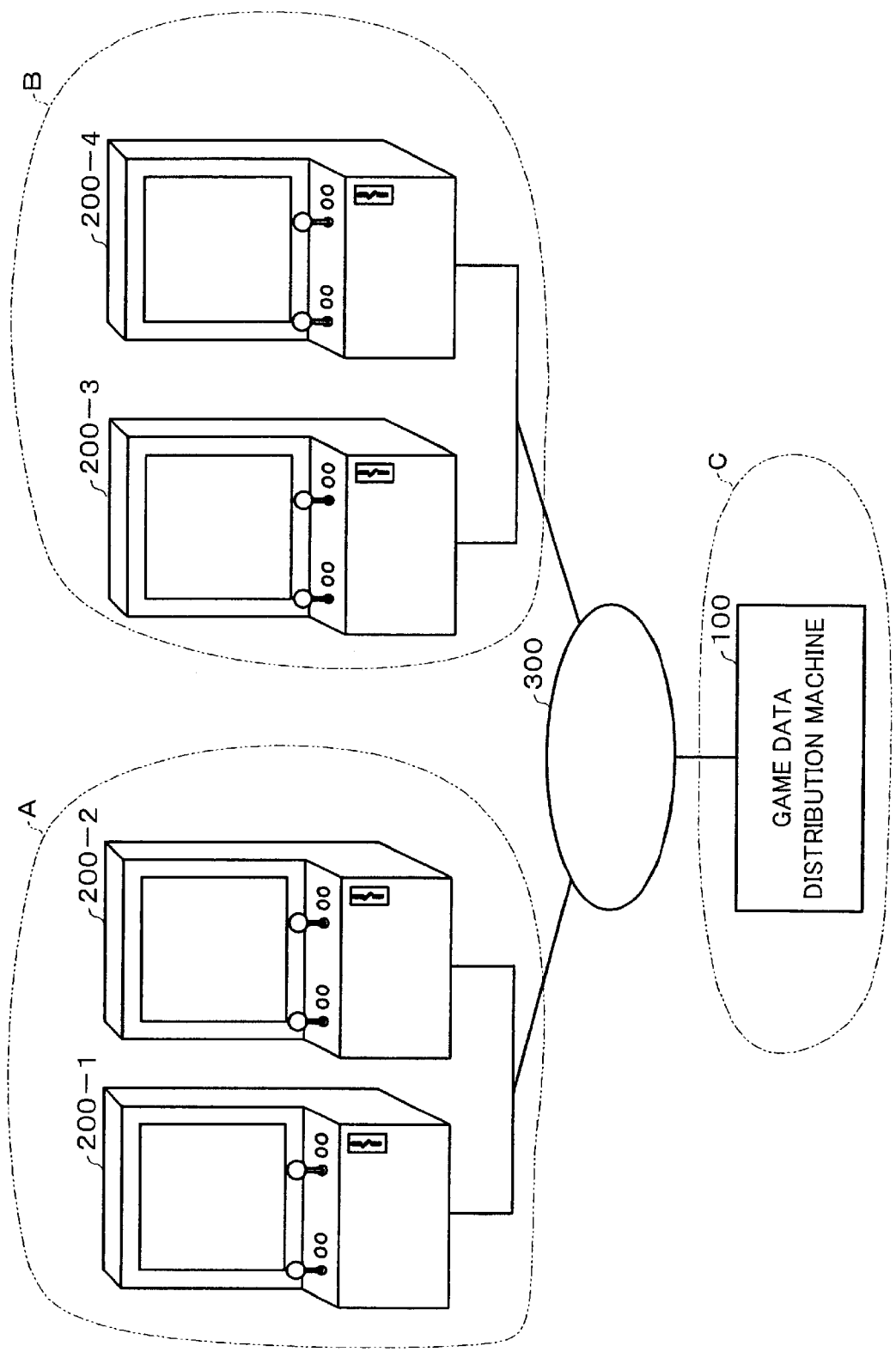
FIG. 1 is a diagram showing one example of a game system according to an embodiment of the invention.

FIG. 1 is a diagram showing one example of a game system according to one embodiment of the invention.

In the game system, C-site where the game data distribution machine 100 exists, A-site where game machines 200-1 and 200-2 exist and B-site where game machines 200-3 and 200-4 exist are connected each other via a so-called ATM (Asynchronous Transfer Mode) network including a communication line 300, i.e., the transmission path.

A multi-player game in a network mode may be played as the game data distribution machine 100 transmits game data to the respective game machines 200. It is noted that the game data here contains at least either one of game image data for displaying game images and game sound data for producing game sounds.

In the multi-player game system in the network mode described above, the respective game machines 200 must be able to display game images synchronized with the progress of the game represented by the game image and the like among the respective game machines 200 so as to be able to play the game on real-time.

In case of a race game for example, game players will sense a sense of incongruity when image displaying speed shifts among the respective game machines 200, i.e., when a plurality of members have started the game in the same time and when the game machines indicate goal time of two members by different time even though the they have reached the goal in the same time.

Operation clock which determines the speed for displaying game images or the like must be synchronized among the respective game machines 200 in order to display the game images in synchronism, i.e., in accordance to the progress of the game.

It is noted that the clock means a clock signal which is the basis of operating speed of each section in the machine in the present embodiment. The operation clock is a clock signal generated per each section within the machine based on the clock. The clock for synchronizing the respective machines within the network will be called reference clock in particular.

While it is conceivable to transmit the clock of the master machine to the respective game machines 200 in order to synchronize them, it is difficult to apply it unless the communication line 300 is fast because the burden of communication increases.

Then, the present embodiment adopts a method of transmitting indication data which indicates the clock speed of the master machine and of synchronizing the clock of the respective game machines 200 to the clock of the master machine gradually based on the indication data in the receiving terminals.

It is noted that the indication data indicates an elapsed time from a certain point of time such as an accumulated clock-count and an accumulated raster-count.

The use of the unit such as the accumulated clock-count and the accumulated raster-count allows the comparison and synchronization reflecting the clock speed of the respective game machines 200 accurately. It is easy to obtain those numerical values in the circuits for displaying images from the structure of the circuit. The use of the accumulated value also allows the slave side to run by itself and to be synchronized in receiving the indication data next time even when a communication error happens to occur and the slave side has not been able to receive the indication data.

The case of using the accumulated clock-count will be explained below in the present embodiment.

Figure 3:
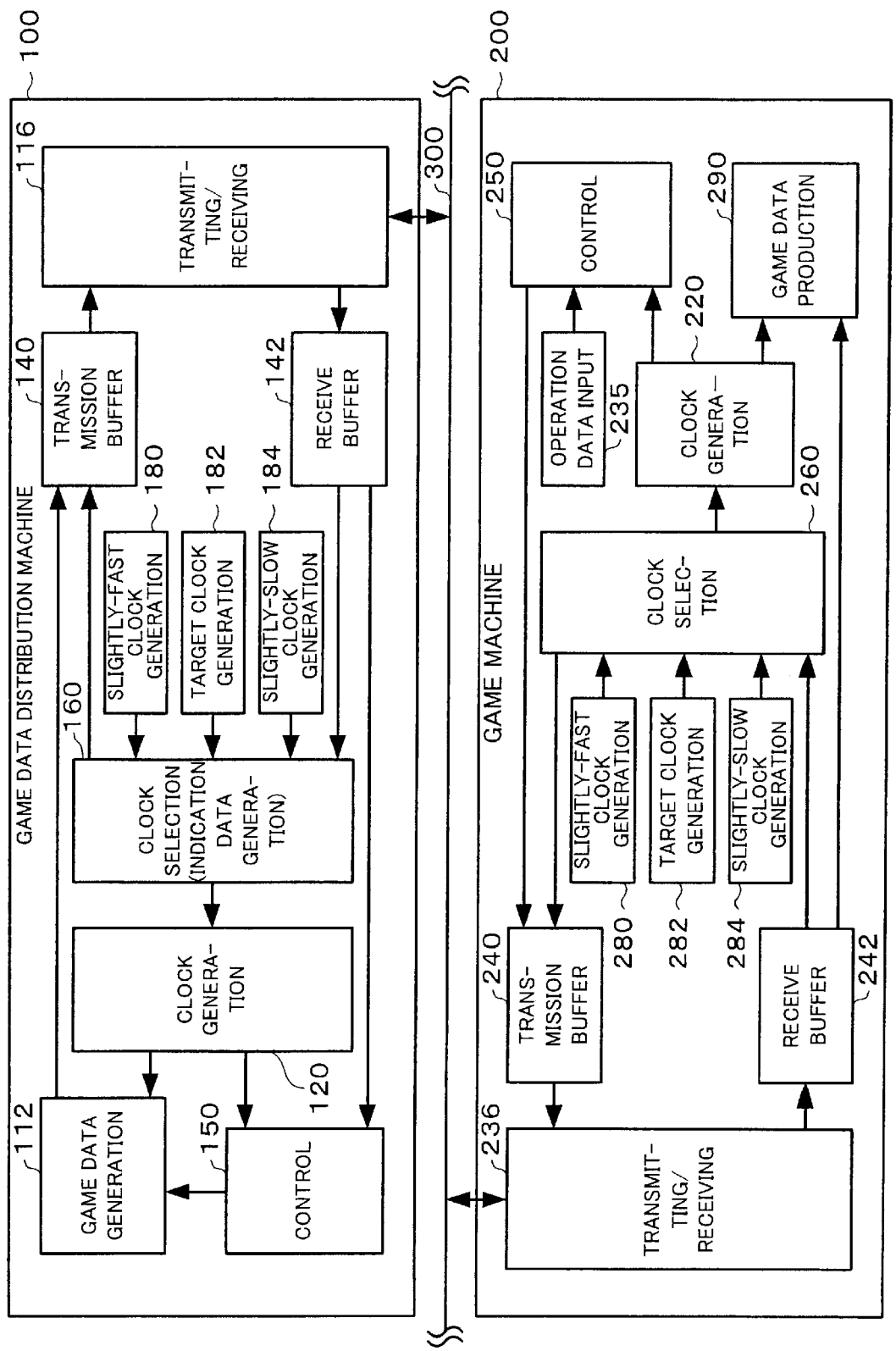
FIG. 3 is a functional block diagram of a game data distribution machine and a game machine according to another example of this embodiment.

FIG. 3 is a functional block diagram of the game data distribution machine 100 and the game machine 200 according to one example of the embodiment.

The game data distribution machine 100 comprises a transmitting/receiving section 116 for receiving distribution requiring data sent from the game machine 200 and for transmitting distributed data including game data to the game machine 200 which has transmitted the distribution requiring data, a game data generation section 112 for generating game images and sounds based on the received distribution requiring data and a control section 150 for controlling the game data generation section 112.

The game data distribution machine 100 also comprises a clock generation section 120 for generating operation clock which determines operating speed of the game data generation section 112 and the like, a clock selection section 160 for supplying reference clock to the clock generation section 120 to generate the indication data to be transmitted to the game machine 200 and a target clock generation section 182 for supplying target clock as the reference clock to the clock selection section 160.

It is noted that the target clock is clock whose frequency is set at high precision as much as possible by assuming a case when the clock of the own machine is used as the reference clock and which is applied as the reference clock in standard in the own machine as long as slightly-slow clock and slightly-fast clock described later are not applied as reference clock.

Meanwhile, the game machine 200 which displays game images comprises a operation data input section 235 for inputting the result of operation made by a game player, a control section 250 for generating the distribution requiring data based on the data of operation, a transmitting/receiving section 236 for transmitting the distribution requesting data to the game data distribution machine 100 and for receiving distribution data including game image data and indication data from the game data distribution machine 100 and a game data production section 290 for taking out the game data from the received distribution data to produce it.

The game machine 200 also comprises a clock generation section 220 for generating the operation clock which determines the operating speed of the game data production section 290 and others per each game executing means such as the game data production section 290 and a clock selection section 260 for selecting clock to be applied from a plurality of clocks whose speed is different based on the received indication data and for supplying the selected clock to the clock generation section 220. The clock selection section 260 functions as clock adjusting means for adjusting the clock speed.

The clocks to be selected are supplied from a slightly-fast clock generation section 280, a target clock generation section 282 and a slightly-slow clock generation section 284. These will be described later. It is noted that a slightly-fast clock generation section 180 and a slightly-slow clock generation section 184 may be provided in the game data distribution machine 100 in addition to the target clock generation section 182 so that the game data distribution machine 100 can also operate as a slave machine.

As hardware for realizing the respective sections described above, ATM switches may be applied to the transmitting/receiving sections 116 and 236, a clock oscillator or a PLL accompanying the clock oscillator may be applied as the slightly-fast clock generation sections 180 and 280, the target clock generation sections 182 and 282 and the slightly-slow clock generation sections 184 and 284, and a selector and a controller for controlling a selector may be applied as the clock selection sections 160 and 260, PLL as the clock generation sections 120 and 220, CPU as the controlling sections 150 and 250, concretely.

Next, the operation of each of these sections will be explained based on the flow of clock processing.

Figure 4:
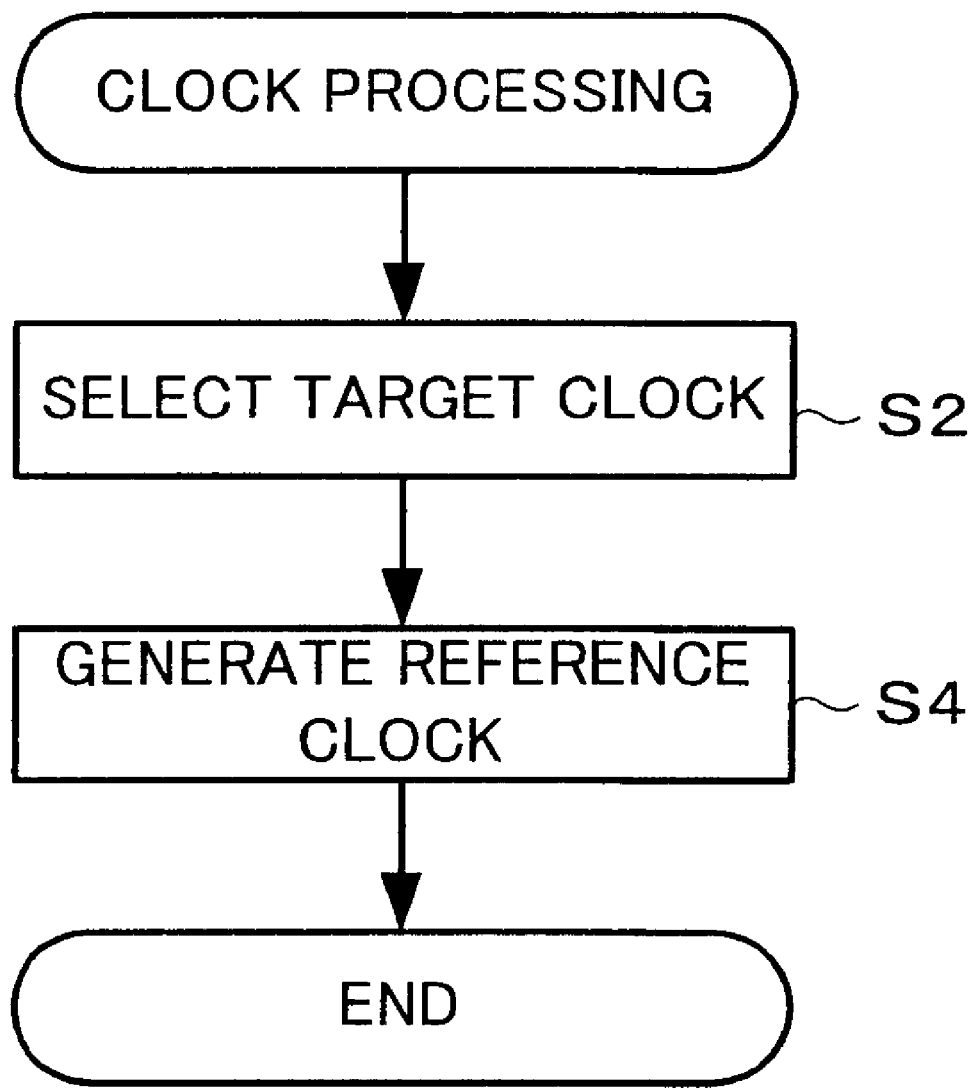
FIG. 4 is one exemplary flowchart showing the flow of clock processing in the game data distribution machine.

FIG. 4 is one exemplary flowchart showing the flow of clock processing in the game data distribution machine 100.

In order to operate as the master side, the game data distribution machine 100 selects the target clock generated by the target clock generation section 182 by using the clock selection section 160 (Step 2).

Next, based on the target clock, the clock selection section 160 generates the reference clock (Step 4). After that, the clock generation section 120 generates the operation clock per each section based on the reference clock and the game data generation section 112, the control section 150 and others operate based on the respective operation clocks.

It is noted that the reference clock or the accumulated clock-count is counted and is stored in the respective clock selection sections 160 and 260 of the game data distribution machine 100 and the game machine 200.

The indication data processing is carried out in parallel with such clock processing.

Figure 5:
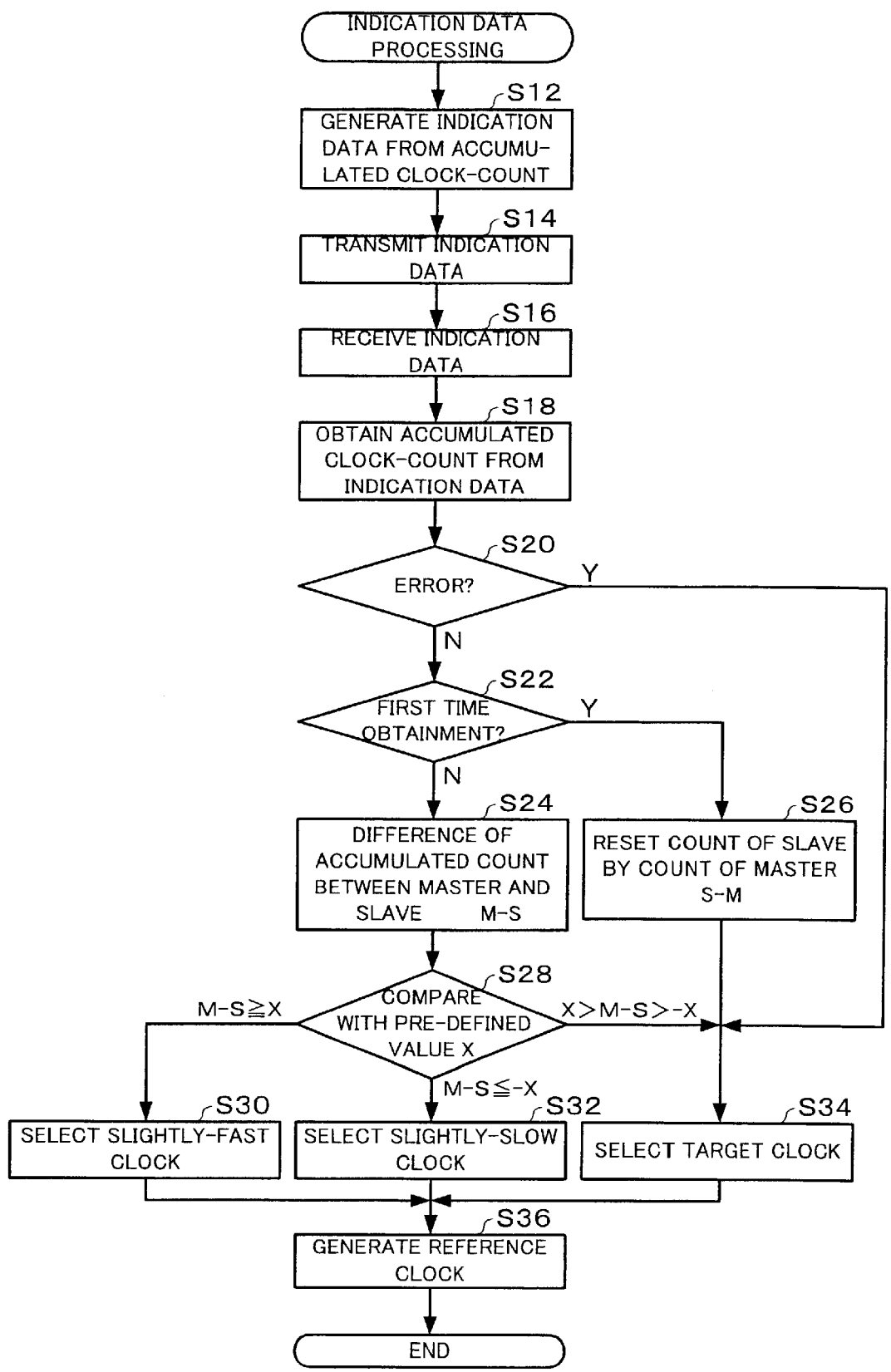
FIG. 5 is one exemplary flowchart showing the flow of indication data processing from the game data distribution machine to the game machine.

FIG. 5 is one exemplary flowchart showing the flow of indication data processing from the game data distribution machine 100 to the game machine 200.

In the game data distribution machine 100, the clock selection section 160 generates the indication data based on the accumulated clock-count of the reference clock at first (Step 12).

The indication data generated by the clock selection section 160 is transferred to the transmission buffer 140 and is transmitted to the game machine 200 as distribution data via the transmitting/receiving section 116 (Step 14).

It is noted that the distribution requesting data is transmitted from the game machine 200 to the game data distribution machine 100 by the transmitting/receiving section 236 via the transmission buffer 240. Receiving the distribution requesting data by using the transmitting/receiving section 116 via the receive buffer 142, the game data distribution machine 100 can specify the game machine 200 to which the distribution data is to be sent in response to the distribution requesting data even when there exist a plurality of game machines 200.

Receiving the distribution data including the indication data (Step 16), the clock selection section 260 in the game machine 200 obtains the indication data, i.e., the accumulated clock-count on the side of the game data distribution machine 100, from the distribution data via the receive buffer 242 (Step 18).

When an error happens to occur at this time (Step 20), the clock selection section 260 unconditionally selects the target clock generated by the target clock generation section 282 (Step 34), and applies this target clock as the reference clock (Step 36).

Meanwhile, when the clock selection section 260 can normally obtain the accumulated clock-count on the side of the game data distribution machine 100 (Step 20), and obtains the accumulated clock-count for the first time (Step 22), the accumulated clock-count counted by the clock selection section 260 of the game machine 200 on the slave side is reset unconditionally by using the accumulated clock-count of the master side (Step 26).

Further, when the clock selection section 260 can normally obtain the accumulated clock-count on the side of the game data distribution machine 100 (Step 20), and obtains the accumulated clock-count not for the first time (Step 220), a difference (M-S) between the accumulated clock-count (M) on the side of the game data distribution machine 100 and the accumulated clock-count (S) on the side of the game machine 200 is calculated by using the clock selection section 260 (Step 24), and is compared with a pre-defined value X (Step 28).

When M-S is greater than X, i.e., the clock of the slave side is slower than the pre-defined value, the clock selection section 260 selects the slightly-fast clock generated by the slightly-fast clock generation section 280 (Step 30).

Then, the clock selection section 260 applies the slightly-fast clock as reference clock (Step 36), and the clock generation section 220 generates the operation clock per each game executing means based on this slightly fast reference clock.

When M-S is smaller than -X, i.e., when the clock of the slave side is faster than the pre-defined value, the clock selection section 260 selects the slightly-slow clock generated by the slightly-slow clock generation section 284 (Step 32). Then, the clock selection section 260 applies the slightly-slow clock as the reference clock (Step 36), and the clock generation section 220 generates the operation clock per each game executing means based on this slightly slow reference clock.

When M-S is greater than -X and smaller than X, i.e., when the difference between the clock of the master side and the clock of the slave side falls within a normal range, the clock selection section 260 selects the target clock generated by the target clock generation section 282 (Step 34).

Then, the clock selection section 260 applies the target clock as the reference clock (Step 36), and the clock generation section 220 generates the operation clock per each game executing means based on this reference clock.

Figure 2:
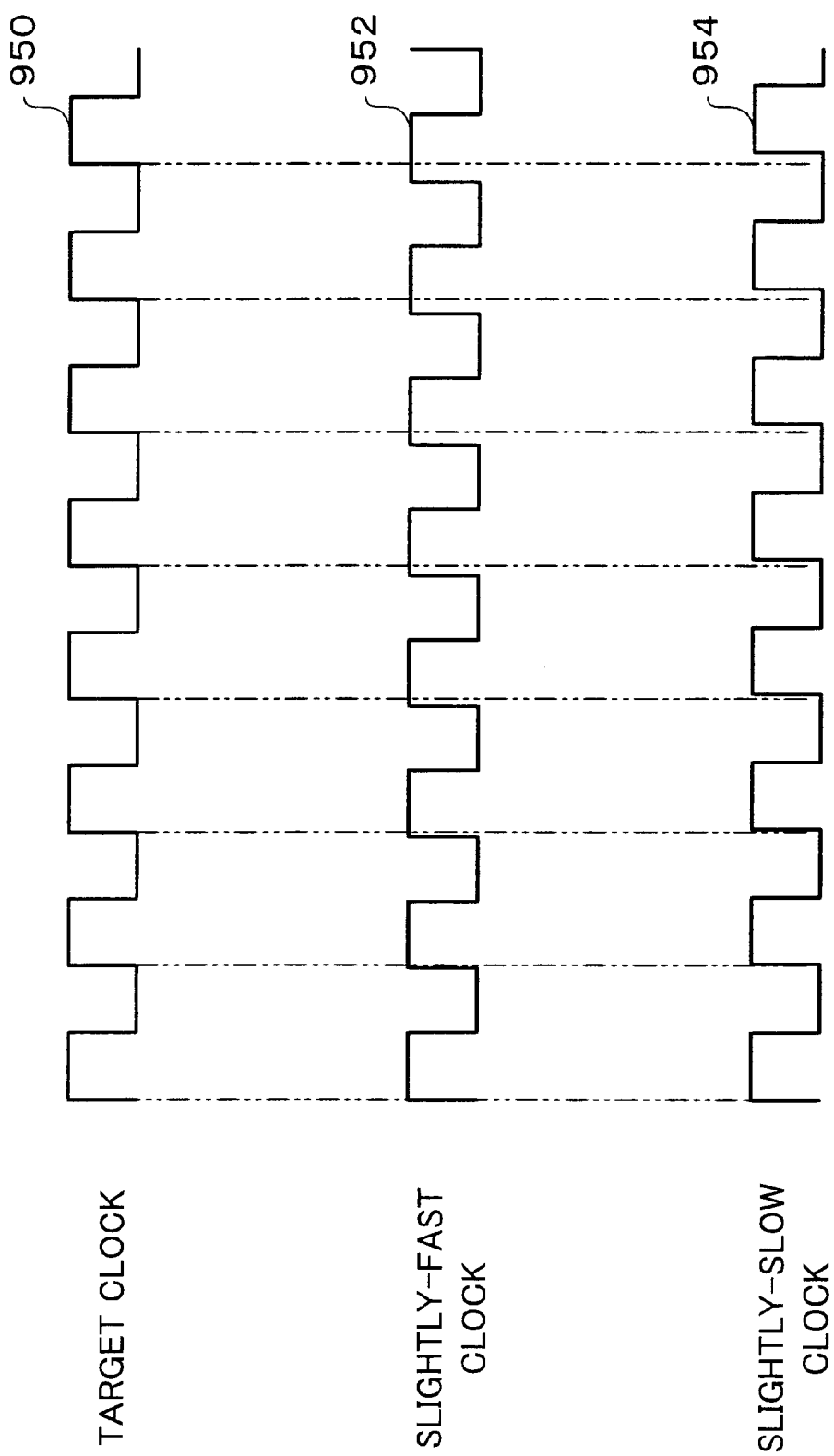
FIG. 2 is a schematic diagram showing one example of clocks used in this embodiment.

FIG. 2 is a waveform chart showing one example of clocks used in the embodiment.

Assume here that X, i.e., the above-mentioned pre-defined value, is 5 and the accumulated clock-count of the game data distribution machine 100, i.e., the master machine, is greater than the accumulated clock-count of the game machine 200, i.e., the slave machine, by 10, i.e., M-S=10.

Receiving the accumulated clock-count of the game data distribution machine 100 as the indication data, the game data distribution machine 100 can judge that the clock of the own machine is slower than the clock of the game data distribution machine 100.

When it is slower, the game machine 200 applies slightly-slow clock 952 which is slightly faster than the present clock as the reference clock to slightly quicken the operation clock.

When the present accumulated clock-count is smaller than the accumulated clock-count of the game data distribution machine 100 by 10 on the other hand, the game machine 200 applies the slightly-slow clock 954 as the reference clock to slightly retard the operation clock.

When -5<M-S<5 holds, the game machine 200 applies the target clock 950 as the reference clock.

Because disturbance of sounds and images hardly occurs by synchronizing the clocks by the fine adjustment, the game players will hardly notice the moment when the synchronization is adjusted and the game executing speed may be adjusted smoothly.

That is, the clock of the own machine is not aligned with the clock of the game data distribution machine 100 at one time but is approached to the clock of the game data distribution machine 100 gradually by repeating the fine adjustment by slightly retarding or slightly quickening the clock.

Thus, the adoption of the method of gradually adjusting the clock speed allows the game players to play the game conformably without noticing the moment when the synchronization is adjusted.

The use of the indication data, not the very clock, allows the synchronization among the plurality of game machines 200 to be realized with a small amount of data as compared to the case when the clock is sent as it is. It is effective when the transmission band of the communication line 300, i.e., the transmission path, is not fast in particular.

The clock of the own machine may be synchronized with the clock of the game data distribution machine 100 accurately even when the indication data is erroneous or when there is a transmission delay without reacting with such abnormal state as much as possible by making the fine adjustment in the adjustment amount of the degree not changing the clock speed considerably.

It is noted that the indication data is not distributed always together with the distribution of game data. It is generated and transmitted only when it is required.

For instance, when game image displaying speed is not synchronized with the other game machine 200, the display of the game screen is shifted between the own game machine 200 and the other game machine 200 in the screens in which the same image or value such as goal time of a racing game must be originally displayed and the game players cannot enjoy the network game on real-time.

The screen displaying speed is determined based on the operation clock as described above. Accordingly, the operation clock of the respective game machines 200 may be synchronized and the screen displaying speed may be adjusted by adjusting the operation clock of the respective game machines 200 based on the indication data sent from the game data distribution machine 100 which functions as the master machine.

It is effective in synchronizing among the game machines 200 which become the opponent in a confronting type game, in playing a game while making communication with the remote place, in playing a game in a limited communication band and the like in particular.

The game players can play the real-time network game conformably by synchronizing the respective game machines 200 via the ATM network as described above.

While the invention has been explained by exemplifying the case of playing the network game, it is also possible to realize such processes by using an information storage medium.

Figure 6:
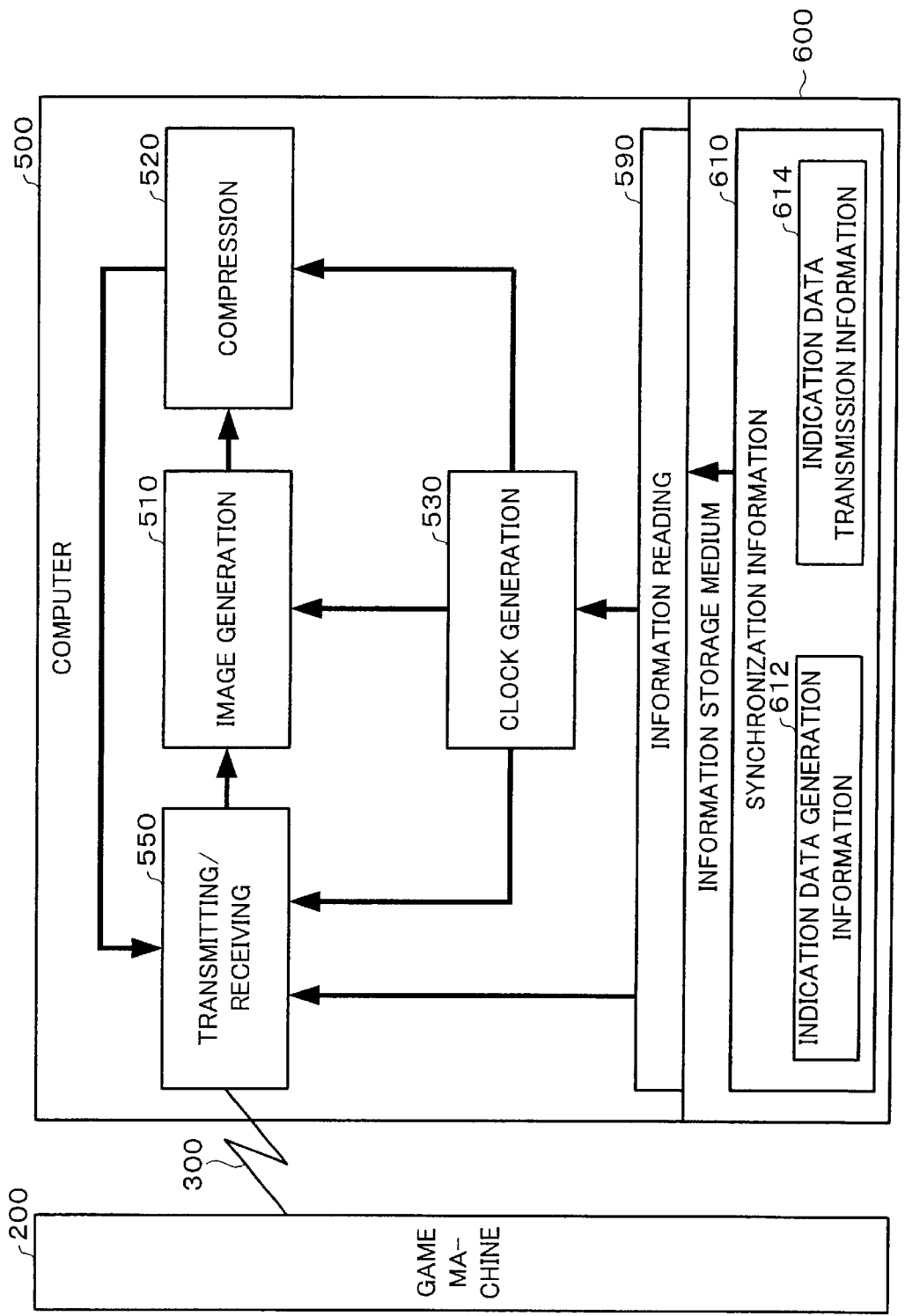
FIG. 6 is a functional block diagram of a computer and an information storage medium in realizing the function of the game data distribution machine.

FIG. 6 is a functional block diagram of a computer 500 and an information storage medium 600 in realizing the function of the game data distribution machine 100.

The computer 500 comprises an image generation section 510 for generating game images based on the distribution requesting data transmitted from the game machine 200 via the communication line 300, i.e., the transmission path, a compression section 520 for compressing the generated images, a clock generation section 530 for generating clocks which determine the operating speed of the image generation section 510 and others, and a transmitting/receiving section 550 for receiving the distribution requesting data and for transmitting the distribution data including the game image data and the indication data.

The computer 500 comprises also an information reading section 590 for reading information from the information storage medium 600.

The information storage medium 600 contains synchronization information 610 for synchronization. Here, the synchronization information 610 contains indication data generation information 612 for realizing means for generating the indication data indicative of the clock speed which determines the game data generating speed for playing the game and which is the basis of the operating speed of the game machine 200 and indication data transmission information 614 for realizing means for transmitting the indication data to the game machine 200.

Next, the operation when the information storage medium 600 is connected to the information reading section 590 of the computer 500 will be explained.

When the information storage medium 600 is connected to the information reading section 590 of the computer 500, the computer 500 reads the indication data generation information 612 and the indication data transmission information 614.

As the indication data generation information 612 is read, the clock generation section 530 functions in the same manner with the clock selection section 160 shown in FIG. 3.

As the indication data transmission information 614 is read, the transmitting/receiving section 550 functions in the same manner with the transmitting/receiving section 116 shown in FIG. 3.

Thereby, the computer 500 can generate the indication data and transmit it to the game machine 200 and can realize the same function with the game data distribution machine 100 described above.

Next, a computer 700 and an information storage medium 800 which function as the game machine 200 described above will be explained.

Figure 7:
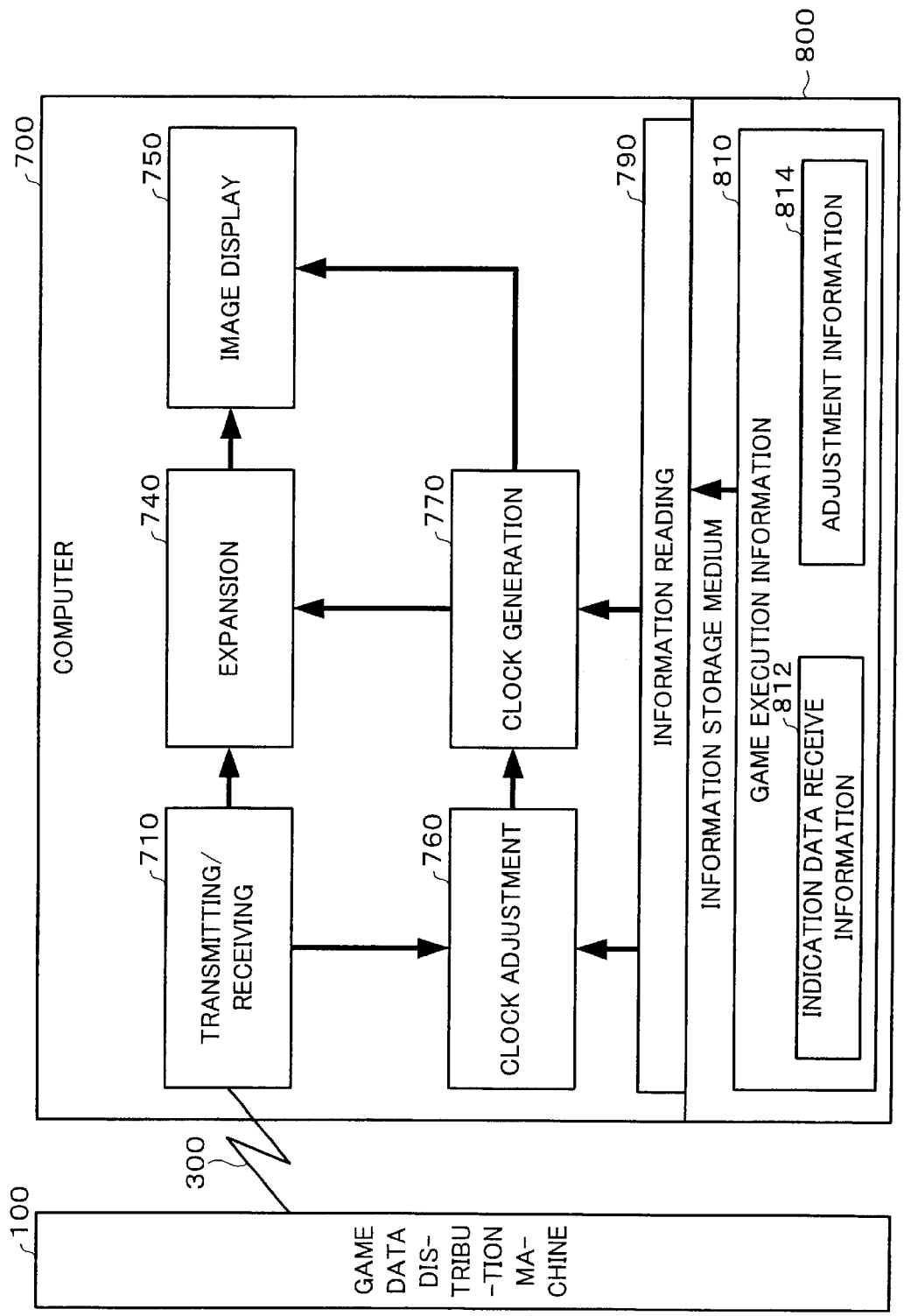
FIG. 7 is a functional block diagram of a computer and an information storage medium in realizing the function of the game machine.

FIG. 7 is a function block diagram of the computer 700 and the information storage medium 800 in realizing the function of the game machine 200.

The computer 700 comprises a transmitting/receiving section 710 for transmitting the distribution requesting data and others to the game data distribution machine 100 via the communication line 300, ie., the transmission path and for receiving compressed game image data and others from the game data distribution machine 100, an expansion section 740 for expanding the game image data and an image display section 750 for displaying the game image based on the expanded game image data.

The computer 700 also comprises a clock generation section 770 for generating the clock which determines image displaying speed and others, a clock adjustment section 760 for adjusting the speed of the generated clock and an information reading section 790 for reading information from the information storage medium 800.

Meanwhile, the information storage medium 800 contains game execution information 810 for executing the game. Here, the game execution information 810 contains indication data receive information 812 for realizing means for receiving game data from the game data distribution machine 100 which distributes the game data to the computer 700 and other game machines and the indication data indicative of the clock speed from the game data distribution machine and adjustment information 814 for realizing clock adjusting means for adjusting the clock speed of own machine so as to synchronize the clock speed of own machine with the clock speed of the other game machines based on the received indication data.

Here, the adjustment information 814 contains information for finely adjusting the operation clock so as to quicken it when the operation clock of own machine is slower than the clock of the game data distribution machine 100 having the master function and so as to retard the operation clock when the operation clock of the own machine is faster than the clock of the game data distribution machine 100 based on the indication data.

Next, the operation when the information storage medium 800 is connected to the information reading section 790 of the computer 700 will be explained.

When the information storage medium 800 is connected to the information reading section 790 of the computer 700, the computer 700 reads the indication data receive information 812 and the adjustment information 814.

As the computer 700 reads the indication data receive information 812, the transmitting/receiving section 710 can receive the indication data in addition to the game image data.

Further, as the computer 700 reads the adjustment information 814, the clock adjustment section 760 can adjust the clock based on the indication data and adjust the game executing speed.

The adjustment of this case is implemented so that the clock speed approaches to the clock speed of the game data distribution machine 100 gradually as described above.

It enables the clock of own machine to be approached to the clock of the game data distribution machine 100.

Because the screen display and others are changed largely when the clock of the own machine is aligned with the clock of the game data distribution machine 100 at a time, the game player notices the moment when the synchronization is adjusted and cannot concentrate on the game.

According to the present embodiment, the adoption of the method of approaching the speed gradually allows the game player to play the game conformably without noticing the moment when the synchronization is taken.

Here, the accumulated clock-count or the accumulated raster-count is used for example as the indication data described above.

The use of the accumulated value allows the clock of the machine having the master function to be compared with the clock of the machine having the slave function in the same standard, so that the comparison becomes accurate and easy.

Thus, the computer 700 can realize the same function with the game machine 200 described above by functioning the transmitting/receiving section 710 in the same manner with the transmitting/receiving section 236 and by functioning the clock adjustment section 760 in the same manner with the clock selection section 260.

It is noted that a CD-ROM, a DVD-ROM and the like from which information is read by a laser beam and hard disk, a memory and the like from which information is read by magnetism may be applied as the information storage media 600 and 800.

It is also possible to realize the functions of the game data distribution machine 100 and the game machine 200 by reading information transmitted from a host unit and the like instead of the information storage media 600 and 800. That is, information stored in the information storage media 600 and 800 is embodied in carrier waves.

While the invention has been explained by exemplifying the case of the network game, it is applicable also to a synchronizing process in a general network, e.g., to a synchronizing process of a network system.

For instance, it may be applied to a network system in which at least one image display is connected with an image distribution machine via a transmission path and the image display and the image distribution machine operate in synchronism.

Here, the image distribution machine comprises an indication data generation section for generating the indication data indicative of the clock speed and a transmitting section for transmitting this generated indication data to the image display machine.

Also, the image display machine comprises an receiving section for receiving the indication data which is transmitted from the image distribution machine and a clock adjustment section for adjusting the clock of own machine so that the clock of the own machine is synchronized with the clock of the image distribution machine based on the received indication data. The clock adjustment section adjusts so as to lower the clock speed of own machine when the clock speed of own machine is faster than the clock speed of the image distribution machine and to increase the clock speed of own machine when the clock speed of the own machine is slower than the clock speed of the image distribution machine based on the received indication data.

It enables the image distribution machine and the respective image displays to be adequately synchronized by distributing the indication data to the respective image displays. Thereby, the image displaying speed may be adjusted among the respective image displays.

Thus, the present invention is also effective in synchronizing a plurality of processors connected via a network.

It is noted that the application of the invention is not limited to the embodiments described above and the invention is applicable also to various modified examples.

For instance, while the game system of the game data distribution machine 100 which functions only as the master machine and the game machines 200 which function only as the slave machine have been explained, the game system may be composed of only the game machines 200 having the master and slave functions.

Figure 8:
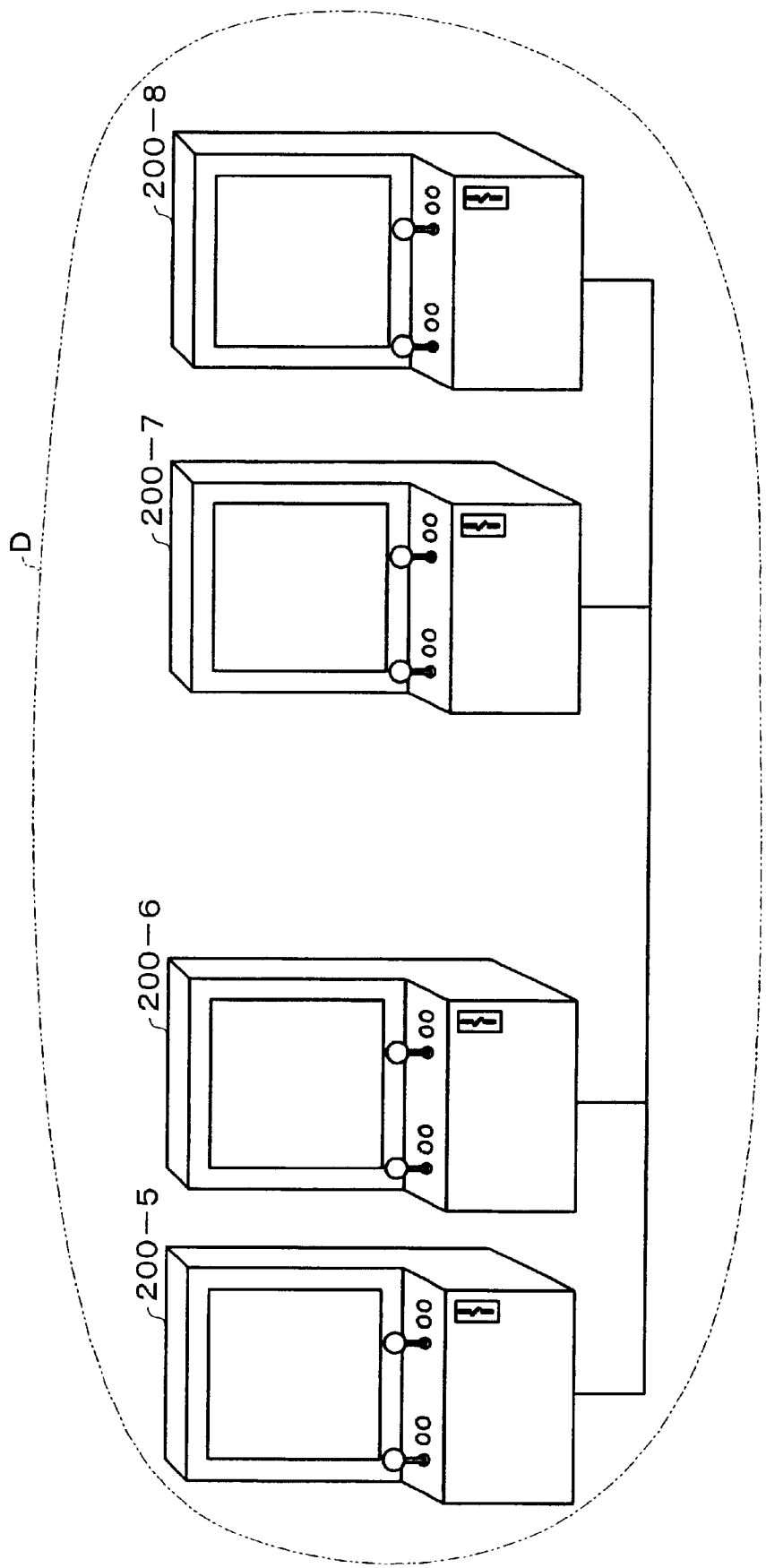
FIG. 8 is a diagram for illustrating a game system for playing a game while game machines synchronize each other when the plurality of game machines exist at one site.

FIG. 8 is a diagram for explaining a game system for playing a game while synchronizing the respective game machines 200 when the plurality of game machines 200-5 through 200-8 exist at one site D.

For instance, the game machines which realize at least one function of the master and slave functions and operate while synchronizing with other game machines. When it realizes the master function, it comprises indication data generation section for generating the indication data indicative of progress of the game and a transmitting section for transmitting the generated indication data to the other game machines which have the slave function. When game machine 200 realizes the slave function, it also comprises a receiving section for receiving the indication data transmitted from other game machine which has master function, a clock adjustment section for adjusting the operation clock within a predetermined adjustment amount based on the received indication data and a game executing section for executing the game based on the adjusted operation clock.

Here, the clock adjustment section functions so as to reduce the clock speed of the own machine when it is faster than the clock speed of the other game machines based on the received indication data or to increase the clock speed of the own machine when it is slower than the clock speed of the other game machine having the master function described above.

Thereby, the respective game machines may be synchronized adequately because the indication data is generated based on the clock speed determining the game executing speed such as image displaying speed in realizing the master function and the clock speed is adjusted and the game executing speed is determined based on the indication data in realizing the slave function. Thereby, because the speeds in displaying the game images and in producing the game sounds are synchronized among the game machines, the game players can play the game conformably in the network type game in particular.

Here, the predetermined adjustment amount described above is preferable to be a width which will not change the clock speed considerably. That is, the game may be executed smoothly without disturbing the sounds and images by synchronizing the clock by the fine adjustment.

In this case, a general method may be applied as a method for determining the game machine 200 which functions as the master machine. For instance, a method of causing the game machine 200 which is turned on at first in the site D to realize the master function and of causing the game machine 200 which is turned on next or thereafter to realize the slave function.

Thereby, the respective game machines 200 may be synchronized smoothly even when the game machines 200 are increased one after another.

When the information storage media 600 and 800 are applied in the mode shown in FIG. 8, the above-mentioned both information may be included in the information storage media 600 and 800.

Thereby, it is possible to realize at least one of the master and slave functions solely by the game machine 200 and a number of game machines 200 may be increased smoothly because they are synchronized adequately.

The game machine 200 is not limited to be a commercial game machine. That is, it may be a home-use game machine. The transmission path is not also limited to be a wire such as a fiber optic cable, but may be radio such as a satellite communication path.

What is claimed is:

1. A game system in which at least one slave machine is connected with a master machine via a transmission path, said slave machine and said master machine operating synchronously each other, wherein said master machine comprises:
   means for generating indication data indicative of clock speed; and
   means for transmitting said generated indication data to said slave machine,
wherein said slave machine comprises:
   means for receiving said indication data transmitted from said master machine; and
   clock adjusting means for adjusting the clock speed of said slave machine so as to synchronize with the clock speed of said master machine based on said received indication data, and
   wherein said clock adjusting means adjusts the clock speed of said slave machine so as to reduce the clock speed of said slave machine when the clock speed thereof is faster than the clock speed of said master machine and to increase the clock speed of said slave machine when the clock speed thereof is slower than the clock speed of said master machine, based on said received indication data.

2. The game system according to claim 1,
wherein said clock adjusting means adjusts the clock speed of said slave machine so as to reduce the clock speed of said slave machine when the clock speed thereof is faster than the clock speed of said master machine and to increase the clock speed of said slave machine when the clock speed thereof is slower than the clock speed of said master machine, based on said received indication data.

3. The game system according to claim 2,
wherein said clock adjusting means finely adjusts the clock speed of said slave machine so as to change gradually to the clock speed of said master machine by a predetermined adjustment amount at a time, based on said received indication data.

4. A network system in which at least one image display machine is connected with an image distribution machine for distributing image data for displaying images on said image display machine via a transmission path, said image display machine and said image distribution machine operating synchronously each other,
wherein said image distribution machine comprises:
   means for generating indication data indicative of clock speed; and
   means for transmitting said generated indication data to said image display machine,
   wherein said image display machine comprises:
      means for receiving said indication data transmitted from said image distribution machine; and
      clock adjusting means for adjusting the clock speed of said image display machine so as to synchronize with the clock speed of said image distribution machine based on said received indication data, and
      wherein said clock adjusting means adjusts the clock speed of said image display machine so as to reduce the clock speed of said image display machine when the clock speed thereof is faster than the clock speed of said image distributing machine and to increase the clock speed of said image display machine when the clock speed thereof is slower than the clock speed of said image distributing machine, based on said received indication data.

5. A game data distribution machine for distributing game data for playing a game to a plurality of game machines in which the game is played while a progressing state of the game in each of the game machines is synchronous each other, said game data distribution machine comprising:
   means for generating said game data;
   means for generating indication data indicative of the clock speed which determines generating speed of said game data; and
   means for transmitting said indication data and said game data to said game machines.

6. A game machine for playing a game with another game machine while a progressing state of the game in said game machine is synchronous with a progressing state of the game in said other game machine, said game machine comprising:
   means for receiving game data from a game data distribution machine for distributing the game data to said game machine and to said other game machine, and indication data indicative of clock speed from said game data distribution machine; and
   clock adjusting means for adjusting the clock speed of said game machine so as to synchronize with the clock speed of said other game machine based on said received indication data,
      wherein said clock adjusting means adjusts the clock speed of said game machine so as to reduce the clock speed of said game machine when the clock speed thereof is faster than the clock speed of said game data distribution machine and to increase the clock speed of said game machine when the clock speed thereof is slower than the clock speed of said game data distribution machine, based on said received indication data.

7. A game machine realizing at least one of a master function and a slave function, and operating synchronously with another game machine, said game machine comprising:
   means for generating indication data indicative of clock speed in realizing said master function;
   means for transmitting said generated indication data to said other game machine in realizing said master function;
   means for receiving said indication data sent from said other game machine in realizing said slave function;
   clock adjusting means for adjusting the clock speed by a predetermined adjustment amount at a time, based on said received indication data in realizing said slave function; and
   means for executing a game based on said adjusted clock speed in realizing said slave function,
      wherein said clock adjusting means reduces the clock speed of said game machine when the clock speed thereof is faster than the clock speed of said other game machine and increases the clock speed of said game machine when the clock speed thereof is slower than the clock speed of said other game machine, based on said received indication data.

8. The game machine according to claim 7, wherein said indication data is an accumulated clock-count.

9. The game machine according to claim 7, realizing said master function when being started before said other game machine, and realizing said slave function when being started after said other game machine.

10. A game machine realizing at least one of a master function and a slave function, and operating synchronously with another game machine, said game machine comprising:
- a circuit for generating indication data indicative of clock speed in realizing said master function;
- a circuit for transmitting said generated indication data to said other game machine in realizing said master function;
- a circuit for receiving said indication data sent from said other game machine in realizing said slave function;
- a clock adjusting circuit for adjusting the clock speed by a predetermined adjustment amount at a time, based on said received indication data in realizing said slave function; and
- a circuit for executing a game based on said adjusted clock speed in realizing said slave function,
  - wherein said clock adjusting circuit reduces the clock speed of said game machine when the clock speed thereof is faster than the clock speed of said other game machine and increases the clock speed of said game machine when the clock speed thereof is slower than the clock speed of said other game machine, based on said received indication data.

11. Computer-usable information embodied on an information storage medium or in a carrier wave, for synchronizing among a plurality of game machines in which a game is played, while a progressing state of the game in each of the game machines is synchronous with a progressing state of the game in each of the other game machines,
- wherein said information comprises information for realizing:
  - means for generating indication data which indicates clock speed for determining generating speed of game data for playing the game and is a reference of operating speed of said game machines; and
  - means for transmitting said indication data to said game machines.

12. Computer-usable information embodied on an information storage medium or in a carrier wave, for a computer playing a game with a game machine while a progressing state of the game in said computer is synchronous with a progressing state of the game in said game machine,
- wherein said information comprises information for realizing:
  - means for receiving game data from a game data distribution machine for distributing the game data to said computer and to said game machine, and indication data indicative of clock speed from said game data distribution machine; and
  - clock adjusting means for adjusting the clock speed of said computer so as to synchronize with the clock speed of said game machine based on said received indication data, and
    - wherein said clock adjusting means adjusts the clock speed of said computer so as to reduce the clock speed of said computer when the clock speed thereof is faster than the clock speed of said game data distribution machine and to increase the clock speed of said computer when the clock speed thereof is slower than the clock speed of said game data distribution machine, based on said received indication data.

13. Computer-usable information embodied on an information storage medium or in a carrier wave, for realizing at least one of a master function and a slave function,
- wherein said information comprises information for implementing:
  - means for generating indication data indicative of clock speed in realizing said master function;
  - means for transmitting said generated indication data to at least one of game machines which have said slave function in realizing said master function;
  - means for receiving said indication data sent from a game machine which has said master function in realizing said slave function;
  - clock adjusting means for adjusting the clock speed by a predetermined adjustment amount at a time, based on said received indication data in realizing said slave function; and
  - means for executing a game based on said adjusted clock speed in realizing said slave function, and
    - wherein said clock adjusting means reduces the clock speed of a computer which uses said computer-usable information when the clock speed thereof is faster than the clock speed of said game machine which has said master function and increases the clock speed of said computer when the clock speed thereof is slower than the clock speed of said game machine which has said master function, based on said received indication data.

14. Computer-usable information, according to claim 13, wherein said clock adjusting means finely adjusts the clock speed of said game machine so as to change gradually to the clock speed of said other game machine by a predetermined adjustment amount at a time, based on said received indication data.

15. The information according to claim 13, wherein said indication data is an accumulated clock-count.

* * * * *